E. S. DICKEY.
GAS METER.
APPLICATION FILED MAR. 20, 1918.
1,306,219.
Patented June 10, 1919.
4 SHEETS—SHEET 1.
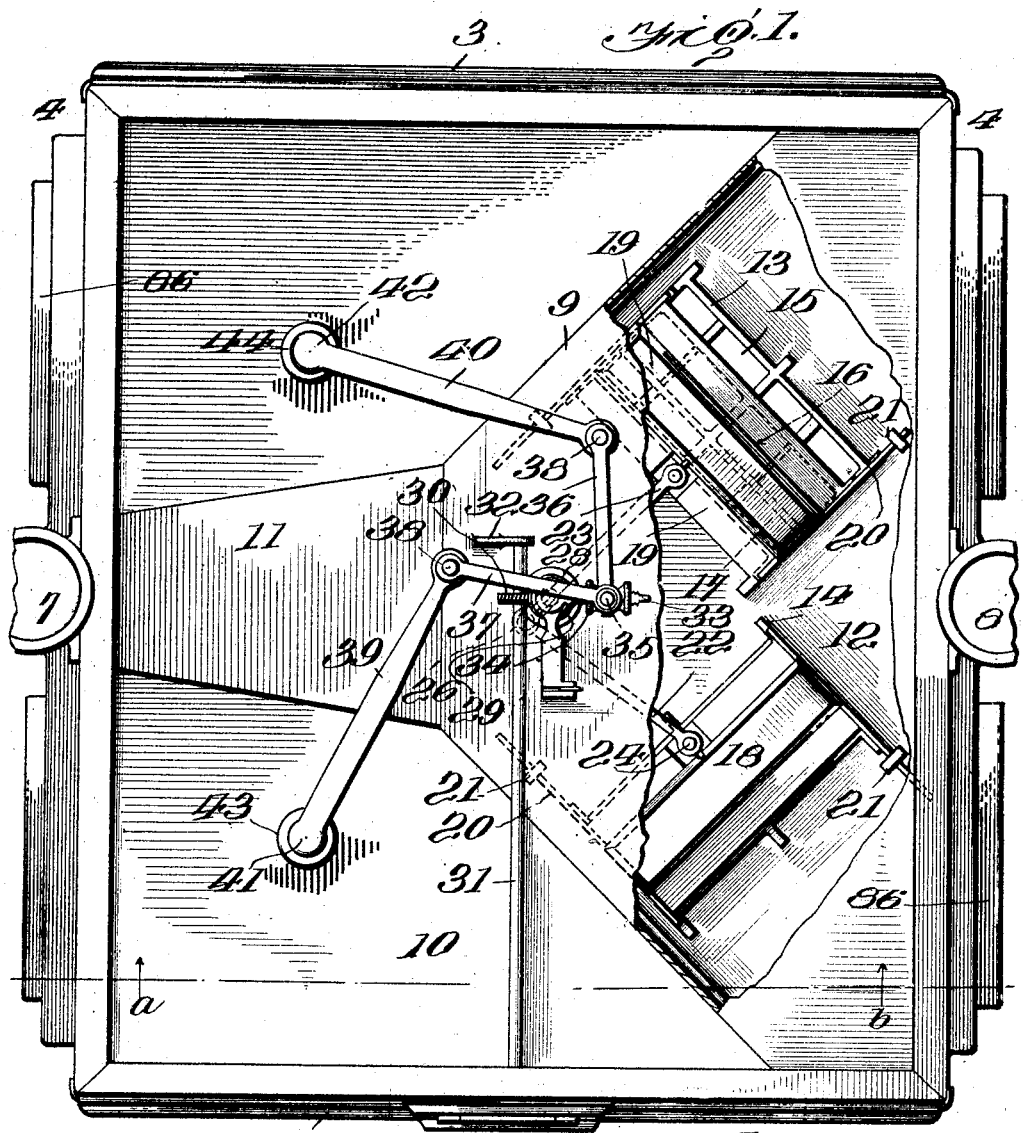
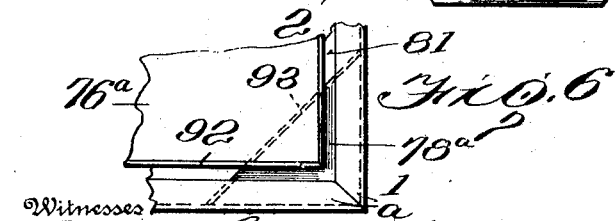
Witnesses
Floyd R. Cornwall
Inventor
Edmund S. Dickey,
By Titian Johnson
Attorney

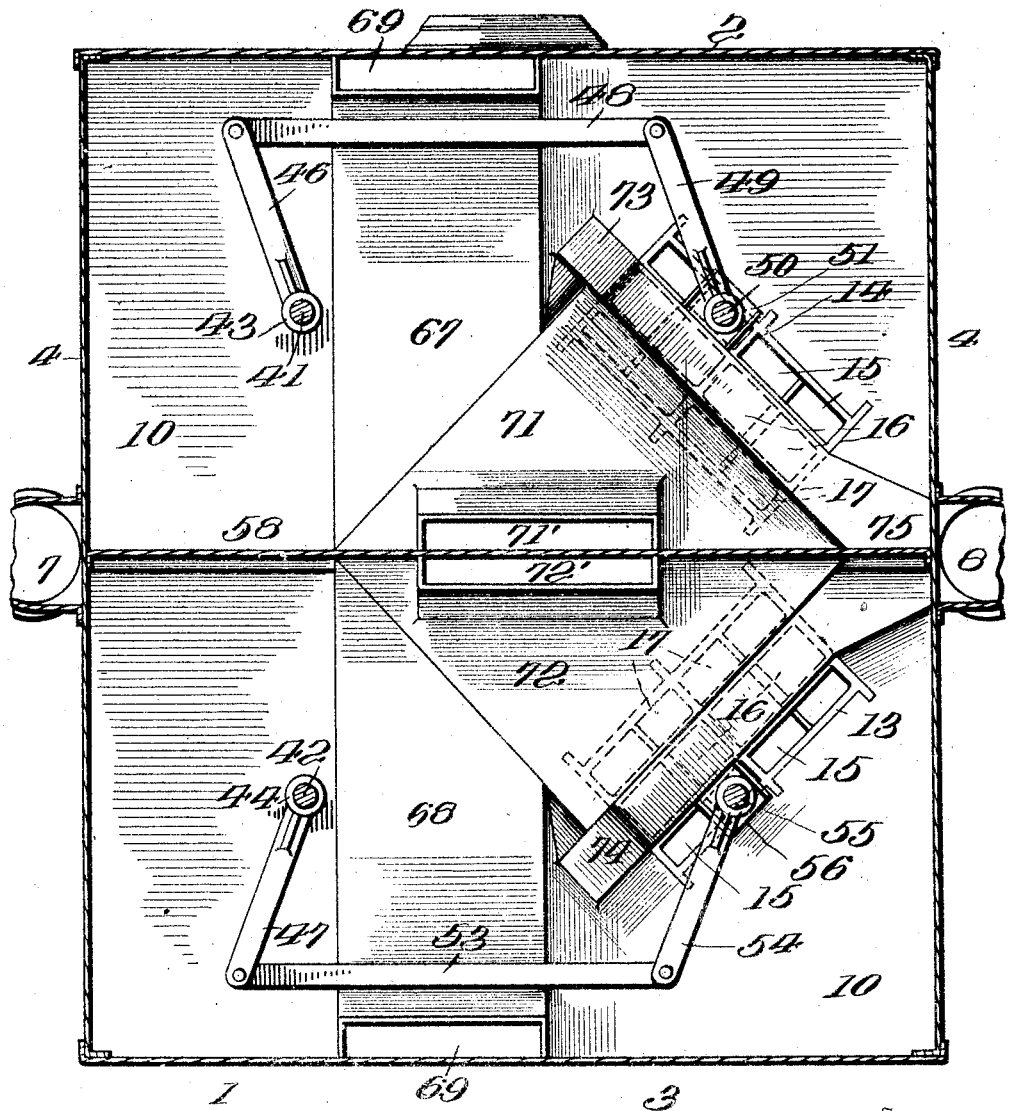

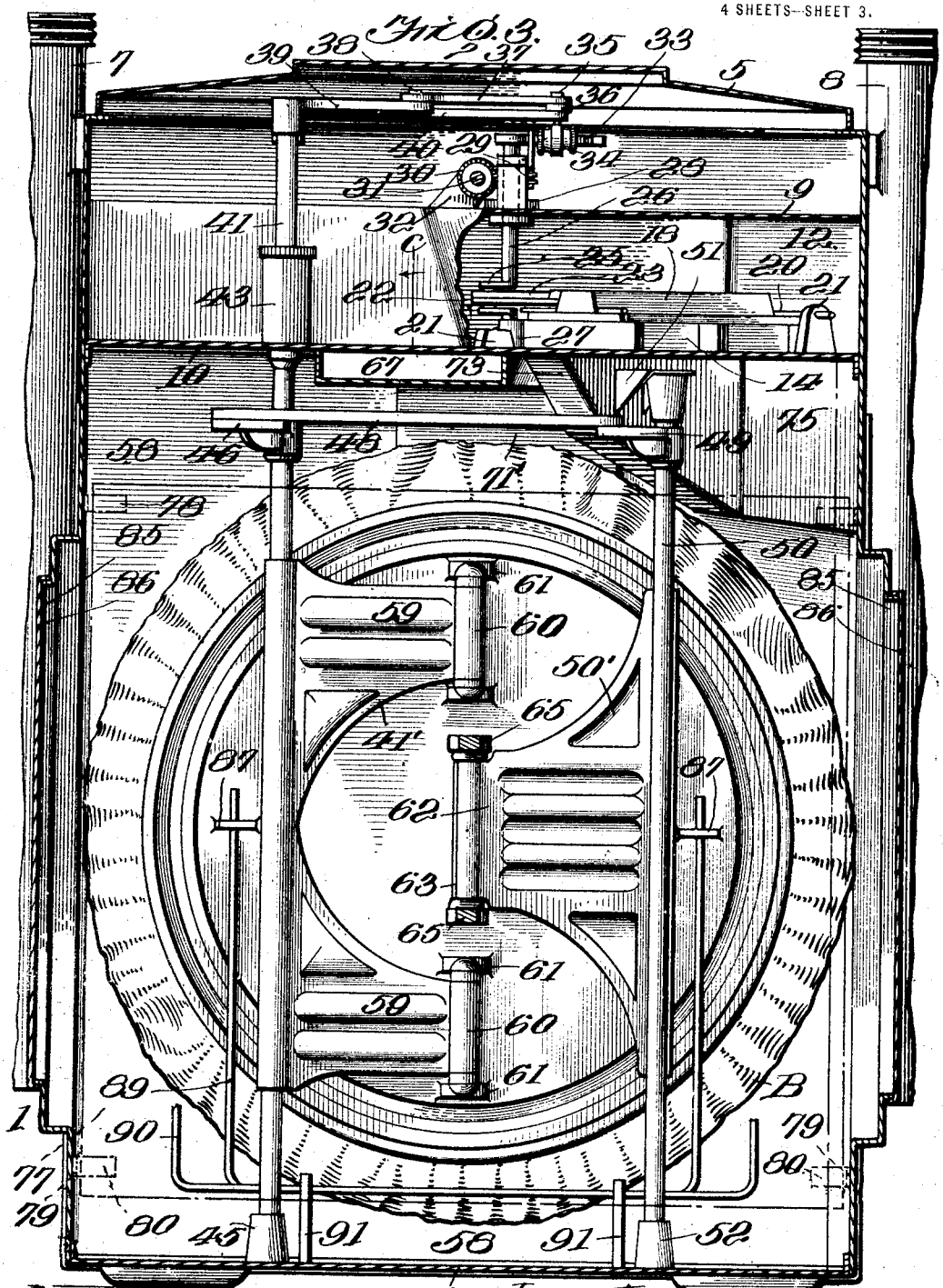

E. S. DICKEY.
GAS METER.
APPLICATION FILED MAR. 20, 1918.
1,306,219.
Patented June 10, 1919.
4 SHEETS—SHEET 4.
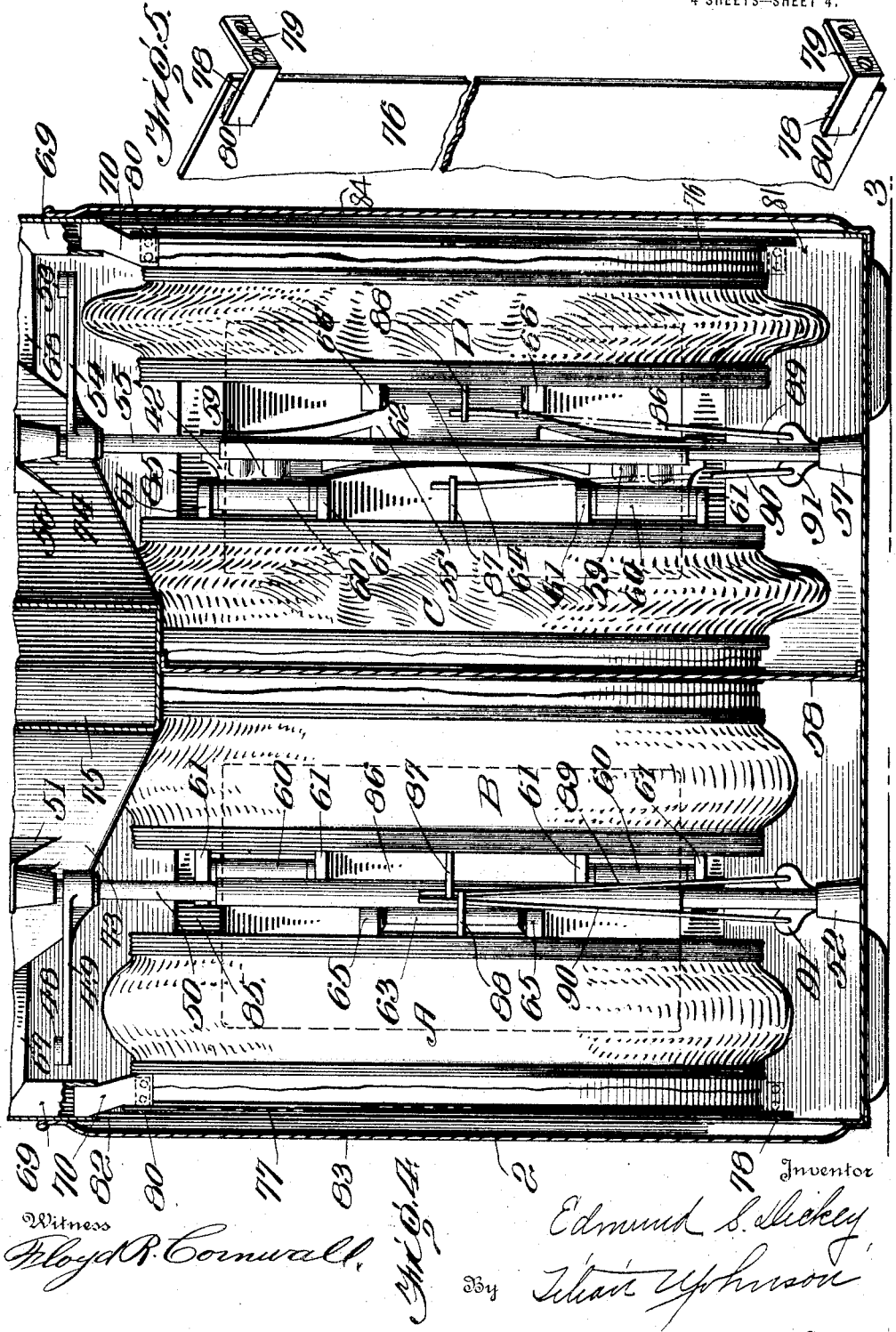

UNITED STATES PATENT OFFICE.

EDMUND S. DICKEY, OF BALTIMORE COUNTY, MARYLAND, ASSIGNOR TO AMERICAN METER COMPANY, INC., OF NEW YORK, N. Y., A CORPORATION OF DELAWARE.

GAS-METER.

1,306,219.  Specification of Letters Patent.  Patented June 10, 1919.

Application filed March 20, 1918. Serial No. 223,578.

*To all whom it may concern:*

Be it known that I, EDMUND S. DICKEY, a citizen of the United States, residing in the county of Baltimore and State of Maryland, have invented certain new and useful Improvements in Gas-Meters, of which the following is a specification.

This invention relates to improvements in dry type gas meters.

It has for its primary object to increase the capacity of the meter without materially increasing its size, and at the same time reduce the speed of rotation of the meter fittings, or the speed ratio of the meter parts, thus reducing wear on the moving parts and insuring accuracy of measurement by reason of absence of lost motion due to wear, and consequently increasing the life of the meter, and also reducing pressure absorption of the meter.

In meters of this character, the space required for installation is of great importance, and obviously the production of the meter unit of greatly increased capacity, with very inconsiderable increase in size, is of great advantage.

It is well recognized with regard to the size of the unit, that the dimensions of width and height are the most important, the dimension of depth being of comparatively little importance, and the increase in the outside dimensions, which I make in order to get the increased capacity I have mentioned, is made in the depth of the meter.

The ordinary thirty light standard meter will pass approximately 600 cubic feet of gas per hour with $1\frac{6}{10}$ revolutions of the meter parts per cubic foot of gas. With my construction and arrangement of valves and channels, and with the use of four diaphragms located in separate gas tight compartments in the meter casing, I find that I can increase the capacity to approximately 1250 cubic feet of gas per hour, with a speed ratio of $\frac{7}{10}$ of one revolution per foot of gas delivered, thus effecting approximately an increase of 105% in capacity, and a decrease of approximately $56\frac{1}{4}$% in the number of revolutions or cycles of the meter parts, the reduction in speed, as above indicated, obviously lessening the wear on the meter in proportion to the amount of gas it will pass, and thus greatly increasing its life, as well as reducing to a minimum, the requirement of repairs.

A further object of this invention is to make the internal parts of the casing easy of access for the purposes of repair, and also assembling in the first instance.

In the meter about to be described, I employ two valves and four diaphragms, the two valves being "twin valves," each twin valve working as a single valve and serving two meter diaphragms, or a set constituted by two diaphragms, located in one diaphragm compartment, the twin valves and the two diaphragms working as a single unit, the formation of the valves being such that great valve area is obtained, and the consequent capacity of the meter for the prompt intake and discharge of gas.

With my improvements I control, through a single valve arm, a valve of double the size of the valve of the ordinary meter and double the valve area, without increasing the valve stroke, or the distance of travel of the valve in controlling the ports in the valve seat, feeding to four diaphragms instead of two, as in the present day type.

It will be obvious that with the installation of a meter capable of passing 1250 cubic feet of gas per hour, with but slight increase in the external dimensions of the meter, and that, in the direction of the depth of the meter, or an increase approximately of 105% in capacity over the ordinary thirty light meter, the number of units required for a given installation will be reduced approximately one half, which also reduces the number of manifold fittings and connections necessary to the installation of the meters.

Other objects and advantages, flowing from my improved construction will become apparent to those skilled in the art, in the course of the following description, in which:

Figure 1 is a top plan view of the meter, with the top plate removed, a part of the valve housing being broken away.

Fig. 2 is a sectional view of the meter, just below the valve table, looking toward the top of the meter, showing the arrangement of valve ports and channels;

Fig. 3 is a section taken about on line $a$—$b$ of Fig. 1, with cover in place.

Fig. 4 is a section taken about on line c—d of Fig. 3.

Fig. 5 is a detail broken perspective view of one of the detachable mounting plates which support the two outer diaphragms.

Fig. 6 is a broken detail view of a corner of the front or back of the meter, showing another manner of securing the diaphragms to the meter casing.

Referring to the drawings, the numeral 1 designates the meter casing, generally rectangular in form, but which I change somewhat in construction, as will appear. It comprises generally, the front plate 2, rear plate 3, side walls 4, top 5 and bottom 6.

The numeral 7 designates the intake connection, and 8 designates the outlet, the inlet communicating with a substantially triangular housing 9, soldered or otherwise secured to the valve table 10, the housing extending entirely across one side of the meter casing, and partly across the front, and rear walls, and at its narrowed portion, running into a channel 11, communicating with the intake 7, a portion of the housing constituting a valve chamber 12, provided with valve seats 13, and 14, having therein casing ports 15, outlet ports 16, and diaphragm ports 17. These ports are controlled by reciprocating or sliding valves 18 and 19, each guided by two rods 20 attached to the sides of the valves and passing through apertures in lugs 21, upon the valve table, the guiding means being of the kind usually employed in meter slide valves. The numerals 22 and 23 designate valve arms pivotally connected, as indicated at 24, to the valves, with their other ends connected with crank 25, of valve operating shaft 26, stepped in bearing 27 on the valve table. The upper end of the shaft passes through, and is supported by stuffing box 28 in the top of the housing 9, and is provided above the housing 9 with the usual worm 29, in mesh with the gear 30, keyed upon the dial shaft 31, having its bearing in an ear 32, upon the housing, the shaft extending to, and forming a part of the dial mechanism, as is usual in meters of this class.

The upper end of the valve operating shaft carries the usual tangent 33 with adjusting nut 34 thereon, with which nut is formed a stud 35, whereby the tangent is connected with the links 36 and 37, having pivotal connection, as indicated at 38, with the arms 39 and 40, of flagstaffs 41 and 42, which pass through and have bearings in stuffing boxes 43 and 44, firmly secured to the valve table. These flagstaffs 41 and 42 carry peculiarly constructed flags 41' and 42', and the staffs extend to the bottom of the meter, where they are stepped, at their lower ends in the bearings 45. The flagstaff 41 has secured to it, just below the valve table, an arm 46, and the staff 42 carries a similar arm 47. Pivotally connected with the free end of the arm 46 is link 48, which has its other end similarly connected to an arm 49 secured to supplemental flagstaff 50, which staff is mounted at its upper end, in a bearing 51, and at its lower end is stepped in a bearing 52 on the floor of the meter casing. Pivotally connected with the arm 47 of flagstaff 42 is a link 53, having its other end pivotally connected with the arm 54 of the supplemental flagstaff 55 which, like the staff 50, is mounted at its upper end in bearing 56, and at its lower end is stepped in a bearing 57 on the floor of the meter, and thus, through the described connections, the valve operating shaft is connected with the main flagstaffs, and the main flagstaffs are connected with the supplemental staffs. These supplemental staffs 50 and 55 carry flags 50' and 55'

The meter casing is divided into two compartments by a central partition 58, which extends from the bottom of the meter casing to the underneath side of the valve table, except where said partition is recessed or cut away, to receive the bottom portions of the gas channels. A, B, C and D designate diaphragms, a pair or set of which is located in each compartment, the inner or two central diaphragms being secured to and supported by the central partition, while the outer two are attached to and supported by separate removable plates which will be presently described. The flags 41' and 42' are formed with two arms 59, which carry at their free ends sleeves 60 for reception between ears 61 on the outer diaphragm plates of the two inner diaphragms B and C, there being a pin connection between the ears and sleeves, whereby pivotal connection between the flags and the diaphragms is formed. The flags 50' and 55' are carried by the supplemental flagstaffs 50 and 55 and these flags are formed with single arms 62, each having at its free end a sleeve 63, received between ears 65, carried respectively, by the inner plates of the outer diaphragms, there being pins extending through the ears and sleeves, thereby forming pivotal connection between these flag arms and the outer diaphragm in each compartment. Thus connection is made between the two inner diaphragms and the main flagstaffs 41 and 42, and between the outer diaphragms and the supplemental flagstaffs 50 and 55, and by reason of the link connections 48 and 53, between the arms of the flagstaffs, the flagstaffs in each meter compartment will oscillate in unison and thus communicate the movement, resulting from the expansion and collapse of each pair of diaphragms, to the valve operating shaft, and through the arms 39 and 40, mounted on the main flagstaffs, above the valve table.

The numerals 67 and 68 designate diaphragm channels on each side of the partition 58. The outer ends of the channels connect with intersecting vertical channels 69, which receive the upper ends of short connecting channels 70, communicating with the two outer diaphragms A and D, as best shown in Fig. 4 of the drawings. The inner end of the channel 67 opens into triangular channel 71, on one side of the partition and the channel 68 communicates with a similarly shaped channel 72 on the opposite side of the partition, and these channels 71 and 72 in turn, communicate with short diaphragm connecting channels, the channel 71 connecting with the channel 71' and the channel 72 connecting with similar channel 72', which latter channels connect with the two inner diaphragms B and C on opposite sides of the partition 58.

The numerals 73 and 74 designate the outlet channels into which all of the outlet ports 16 in the valve seats open. These two channels are brought together adjacent to the outlet connection, as indicated at 75, and communicate with the outlet, and the flow of gas to said channels, through all of the other channels is controlled by the valves 18 and 19.

It will be observed that outlet channels 73 and 74 incline toward the outlet connection 8, thereby assuring complete drainage toward the outlet, of the accumulations of gas condensates, thus eliminating the possibility of the moving meter parts from becoming fouled, with the consequent retardation in their smooth operation, which fouling would obviously increase friction and consequently increase meter resistance, which is to be avoided.

The diaphragms A and D are not connected directly with the front and back of the casing, but in order to facilitate the easy assembly of the meter parts in the first instance, and to aid in repairs when necessary, I provide for each outer diaphragm A and D, a separate plate 77 and 76, the diaphragm D being carried by the plate 76 and the diaphragm A carried by the plate 77, the plates serving also to close the diaphragms. In other words, they form the outer diaphragm plates. The numeral 78 designates eight angle pieces, and one arm of each angle piece is provided with apertures 79 for the passage of rivets, and these angle pieces are thus secured permanently to the sides of the meter casing, four on each side in the construction illustrated, and when so attached, the angle pieces present eight arms 80 which are soldered to the outer faces of the plates 76 and 77, four to each plate. The front and back of the meter are provided with large oppositely disposed openings 81 and 82, through which the plates and the diaphragms are inserted. These openings, in the completed structure, are covered by plates 83 and 84, which plates are soldered to main portions of the meter casing. In order to provide ready access to the flags and flagstaff mechanism, between each pair of diaphragms in each compartment, I provide, opposite each set, side openings 85, best shown in Fig. 3, and also indicated in dotted lines in Fig. 4. These openings are in turn closed in the completed meter by plates or covers 86, which are soldered to the flanges formed on the meter casing, as shown.

The outer plates of the inner diaphragms B and C are provided with oppositely disposed ears 87, and the inner plates of the two other diaphragms carry similar ears 88 all of the ears having apertures through them for the passage of the upper ends of the U-shaped guide rods 89 and 90, rockably mounted in bearings in short standards 91, securely fastened to the bottom of the meter.

The adjoining ears of each diaphragm are arranged out of line with each other, that is to say, one above the other and the ears carried by diaphragms A and D are outside the ears carried by diaphragms B and C, so that the guide rods and ears will not interfere in any way, with the free complete simultaneous expanding movement of the diaphragms in filling.

In operation the gas enters the meter through the intake connection 7, filling the housing over the valve table, and after the meter is in full operation and the valves are being reciprocated by the expansion and collapse of the diaphragms, the gas passes through the diaphragm ports 17, through the channels 71, 72, 71' and 72', 67, 68, 69 and 70 to the diaphragms, and through the casing ports 15, direct to the diaphragm compartments, but the valve movements are so timed that the diaphragms in one compartment on one side of the partition 58, will fill simultaneously, say through the channels 72, 72', 68, 69 and 70 while the diaphragms on the opposite side of the partition 58 are emptying, say for instance, through channels 70, 69, 67, 71' and 71. The valve movements are such as to open the outlet ports 16 in the valve seats, to establish communication successively between a pair of diaphragms and the outlet channel, when the diaphragms of a set are exhausting, and between a diaphragm compartment and the outlet channel, when a set of diaphragms is filling, the connections being such that a set of diaphragms on one side of the partition 58 is filling, while the other set is emptying or exhausting, the strokes being overlapped so as to prevent dead center and insure the continuous flow of gas through the meter. After the gas is passed to the outlet channels 73 and 74 from either compartment, or from either set of diaphragms, it passes to and through the common outlet 75 to and through the meter outlet 8.

As before stated, the construction of the flags attachd to the main and supplemental flagstaffs is peculiar to my invention. They are, it will be noted, so formed that the flag constituted by the single arm connected with one diaphragm is received between the two arms of the adjoining flag, or the flag connected to the adjoining diaphragm, thus an arrangement is made by which the diaphragms can expand to their full extent, with the consequent utilization of the entire space between the diaphragms in the diaphragm compartment.

The provision of openings 85 in the sides of the meter casing, opposite the space between a pair of diaphragms, is also peculiar to this invention and, as before stated, provides means for ready access to the flagstaffs and other parts between the diaphragms.

Referring to the modification shown in Fig. 6, 76$^a$ indicates the diaphragm plate or the plate to which one of the outer diaphragms is connected, which plate, as before mentioned, serves as a closure for the diaphragm. In this form of mounting the angle arms are done away with, and the plate 76$^a$ is provided with a short outwardly extending flange around its edges, to give strength and rigidity to the plate. 78$^a$ designates a triangular bracket which, for strengthening purposes, is provided with a short downturned flange 93 and this bracket is soldered or otherwise secured to the inturned flanges adjacent the opening 81 in the meter casing, it being understood that there are, for each opening, four of such brackets, one in each corner. The plate 76$^a$ is soldered to the outer sides or faces of these brackets, thus firmly supporting each plate at four points, and in convenient position for facilitating the attachment and removal of the plates.

Having thus fully described my invention, what I claim is:—

1. In a gas meter, in combination, a suitable casing having intake and outlet openings, two separated diaphragms, a single valve controlling the flow of gas into and out of the diaphragms and through the casing, a valve operating shaft, and connections between the valve operating shaft and the diaphragms, whereby the shaft is rotated, and connections between the operating shaft and the valve, whereby the valve is reciprocated.

2. In a gas meter, in combination, a suitable casing having compartments therein, and intake and outlet openings, four separated diaphragms, two valves for controlling the flow of gas into and out of the diaphragms and their compartments, a valve operating shaft, connections between the diaphragms and the operating shaft, and connections between the operating shaft and the valves, for operating the valves.

3. In a gas meter, in combination, a suitable casing having compartments therein, and intake and outlet openings, a valve table, four separated diaphragms arranged in sets of two, each set in a separate compartment, valves on the valve table, one valve for each set of diaphragms, and adapted to control the flow of gas into and out of the diaphragms and their compartments.

4. In a gas meter, in combination, a suitable casing having compartments therein, and intake and outlet openings, a valve table, four separated diaphragms arranged in sets of two and in separate compartments, a valve for controlling the flow of gas into and out of the diaphragms and compartment of one set of diaphragms, and a second valve for controlling the flow of gas into and out of the diaphragms and compartment of the second set, and connections between each set of diaphragms and its valve, whereby the valve is operated.

5. In a gas meter, in combination, a suitable casing having compartments therein, and intake and outlet openings, a valve table, four separated diaphragms in sets of two, each set in a separate compartment, two valves, one for each set of diaphragms and its compartment, for controlling the flow of gas into and out of the diaphragms and their compartments, connections between the diaphragms of each set and its valve, whereby the valves are operated for the purpose set forth.

6. In a gas meter, in combination, a suitable casing having compartments therein, and intake and outlet openings, a valve table having valve seats thereon provided with diaphragm, casing, and outlet ports, four diaphragms arranged in sets of two, each set in a separate compartment, a flagstaff in each compartment, and connections between one of the diaphragms in each compartment, and a flagstaff therein, a supplemental flagstaff in each compartment, and connections between the supplemental flagstaff and a diaphragm in its compartment, connections between the main and supplemental flagstaffs in each compartment, whereby the flagstaffs in each compartment will be operated in unison, a valve operating shaft, and connections between the shaft and the main flagstaff, valves, one for each set of diaphragms and the compartment in which the set is located, and connections between the valves and the valve operating shaft, whereby the valves are operated upon the expansion and collapse of the diaphragms.

7. In a gas meter, in combination, a plurality of main flagstaffs, a plurality of supplemental flagstaffs corresponding in number to the main staffs, the staffs being connected together for similar movement, a plurality of diaphragms and connections between all of the diaphragms and staffs, whereby the expansion and collapse of the diaphragms will impart oscillatory movement to the staffs.

8. In a gas meter, in combination, two pairs of diaphragms, a main flagstaff and a supplemental staff for each pair, the staffs of each pair of diaphragms being so connected as to oscillate in unison and connections between each staff and a diaphragm, whereby the movement of the diaphragms will be imparted to the staffs for the purpose set forth.

9. In a gas meter, in combination, a casing having oppositely disposed openings, a diaphragm having an independent supporting element adapted for connection with the casing adjacent each opening, and a separate plate or cover for sealing the opening.

10. In a gas meter, in combination, a suitable casing having independent oppositely disposed openings, diaphragms having supporting plates connected to their outer sides, means for connecting the plates and thereby the diaphragms to the casing adjacent the openings, and separate plates or covers for closing the casing openings.

11. In a gas meter, in combination, a casing having oppositely disposed openings, independent diaphragm supporting plates, angle arms connected with the casing, adjacent to the openings, and means for attaching the plates to said arms, and a separate plate or cover for closing the casing openings.

12. In a gas meter, in combination, a casing having openings therein, independent diaphragm supporting plates, angle pieces secured to the casing adjacent to the openings and having arms for attachment to the plates, and separate plates or covers for closing the casing openings.

13. In a gas meter, in combination, a casing having an opening therein, a diaphragm having a plate secured to one side thereof, and serving to close the diaphragm, said plate also serving to support the diaphragm, means for connecting the plate to the meter casing adjacent to the opening, and a separate plate or cover for closing the casing opening.

14. In a gas meter, in combination, a plurality of separated diaphragms, and a plurality of flagstaffs, connections between each flagstaff and a diaphragm, the connections being so constructed and arranged as to be received one by the other, to permit the full expansion of the diaphragms toward each other.

15. In a gas meter, in combination, two separated diaphragms, two flagstaffs, each flagstaff having a flag connected with one of the diaphragms, the flags being so constructed and arranged as to be received one by the other, when the diaphragms are fully expanded.

16. In a gas meter, in combination, two diaphragms, two flagstaffs, a flag on one staff being formed with two arms connected with one diaphragm and the flag on the other staff being formed with one arm, the arms of the staffs being adapted to be received one by the other, when the diaphragms are expanded.

17. In a gas meter, in combination, two diaphragms, two flagstaffs, connections between the flagstaffs, whereby they oscillate together, a flag of one flagstaff formed with two arms connected with one diaphragm, and a flag on the other flagstaff formed with one arm adapted to be received between the arms of the adjoining flag, when the diaphragms are expanded, substantially as and for the purpose set forth.

18. In a gas meter, in combination, a suitable casing, a plurality of separated diaphragms arranged side by side in the casing, said casing being provided with side openings opposite the spaces between the diaphragms for access to said spaces, and a plate or cover for closing said openings.

19. In a gas meter, in combination, a suitable casing provided with front and rear openings, a bracket secured to the meter casing at each corner of the openings, diaphragms each having a supporting plate, and means for securing the plate to the brackets.

20. In a gas meter, in combination, a suitable casing, provided with an opening, brackets formed with strengthening flanges on their inner sides, one bracket being located in each corner of the opening, a diaphragm supporting plate, formed with a strengthening flange around its outer edges, and means for attaching the plate to the brackets.

21. In a gas meter, in combination, a suitable casing having intake and outlet openings, a valve table, four separated diaphragms arranged in sets of two, each in a separate compartment, valves on the valve table, one valve for each set of diaphragms and adapted to control the flow of gas into and out of the diaphragms and their compartments.

22. In a gas meter, in combination, a plurality of main flagstaffs, a plurality of supplemental flagstaffs, the staffs being connected together for similar movement, a plurality of diaphragms, and connections between all of the diaphragms and staffs, whereby the expansion and collapse of the diaphragms will impart oscillatory movement to the staffs.

23. In a gas meter, in combination, a plurality of diaphragms, arranged side by side and adapted for simultaneous expansion and collapse, a plurality of flagstaffs, one flagstaff being provided with a flag, connected with one diaphragm and formed with two arms, and the other provided with a flag, comprising a single arm connected with the adjoining diaphragm, the single arm flag being adapted to be received between the arms of the double arm flag, and connections between the flagstaffs whereby they oscillate together.

24. In a gas meter, in combination, a plurality of diaphragms, a plurality of flagstaffs having connection with the diaphragms, each flagstaff provided with an arm and a pivoted link connecting the arms of the flagstaffs, whereby when one flagstaff is oscillated, oscillatory movement is imparted to the other flagstaff.

25. In a gas meter, in combination, a plurality of separated diaphragms adapted to expand toward and collapse from each other, two guides suitably supported in the casing and extending between the diaphragms, a guide for each diaphragm, ears on said diaphragm having apertures therein for the passage of the guides, said guides and ears being so positioned on the diaphragms, as not to interfere with each other, when the diaphragms are fully expanded.

26. In a gas meter, in combination, a suitable casing, a plurality of separated diaphragms, adapted to expand toward and collapse away from each other, brackets secured to the casing, U-shaped guides mounted rockably in said brackets, one guide for each diaphragm, ears carried by the adjoining faces of the diaphragms having apertures therein for the passage of the upper ends of the guides, the ears and guides being so located with relation to each other as not to interfere, when the diaphragms are fully expanded.

27. In a gas meter, in combination, a suitable casing having inlet and outlet openings. two separated diaphragms in a single compartment in said casing, a valve seat having diaphragm, outlet and casing ports therein, a diaphragm channel directly connecting the diaphragm port with an inner diaphragm, and a channel communicating with the outer diaphragm, and also with the first mentioned channel.

28. In a gas meter, in combination, a suitable casing having inlet and outlet openings, two diaphragms in a single compartment in said casing, a valve seat having diaphragm, outlet, and casing ports therein, and a horizontal triangular diaphragm channel communicating directly with the diaphragm port, a vertical channel communicating with the triangular channel and communicating with an inner diaphragm, and a supplemental horizontal channel, communicating with the triangular channel, and with the outer diaphragm and an outlet channel for establishing communication between the outlet port in the valve seat and the meter outlet.

29. In a gas meter, in combination, a suitable casing having intake and outlet openings, a partition in said casing dividing it into two diaphragm compartments, two diaphragms in each compartment, a valve seat for each compartment, and having diaphragm, outlet, and casing ports therethrough, a triangular horizontal channel on each side of the partition, and a vertical diaphragm channel on each side of the partition, the vertical and horizontal channels communicating with each other, on each side of the partition, and directly connecting the diaphragm ports with an inner diaphragm on each side of the partition, and a horizontal channel on each side of the partition, communicating with the triangular channel, on each side of the partition, said horizontal channels each communicating with the outer diaphragm.

In testimony whereof I affix my signature in presence of two witnesses.

EDMUND S. DICKEY.

Witnesses:
  FRANK G. BRERETON,
  TITIAN W. JOHNSON.